United States Patent Office 2,928,930
Patented Mar. 15, 1960

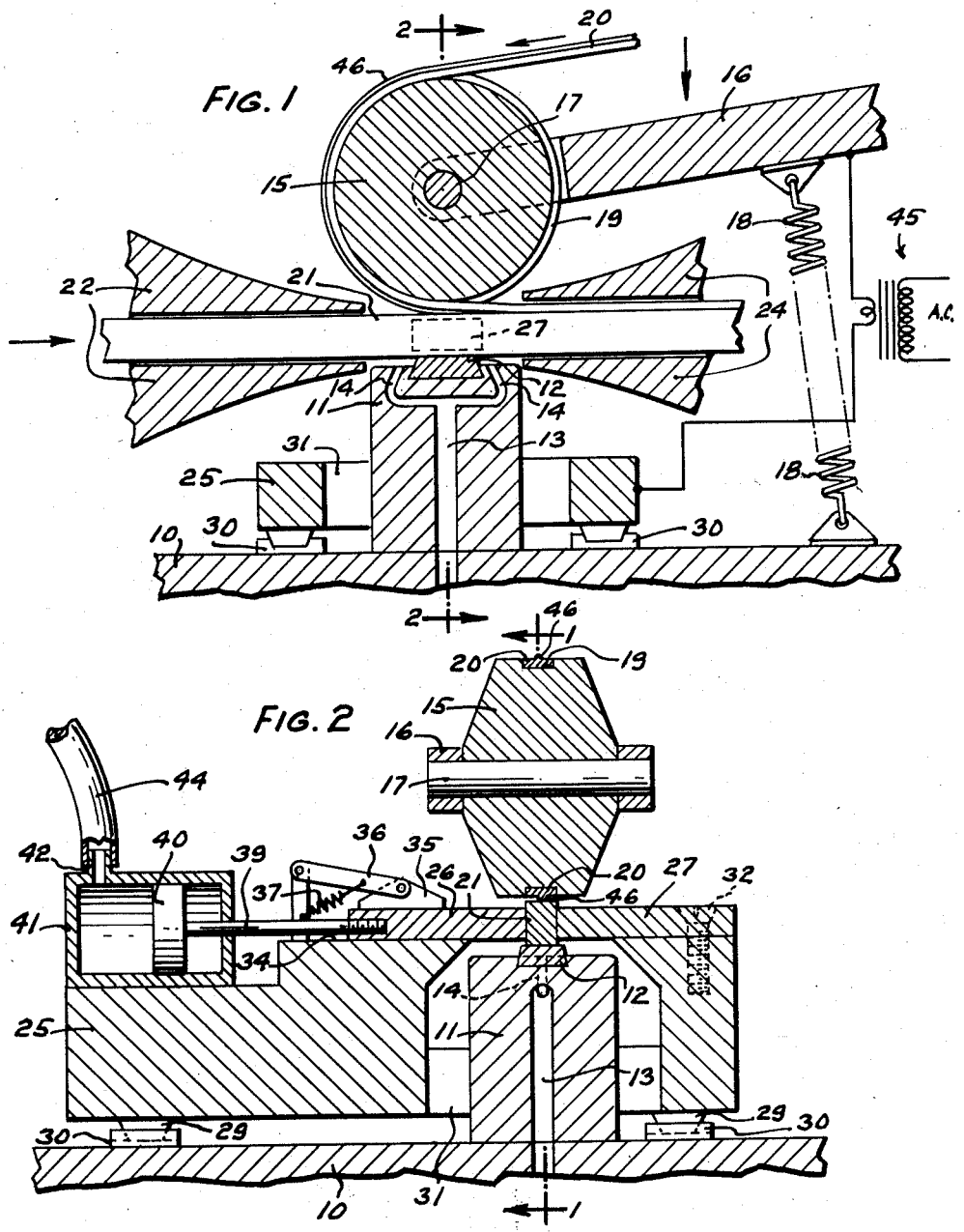

2,928,930

WELDING APPARATUS

Charles C. Veale, West Chicago, Ill., assignor to Western Electric Company, Incorporated, New York, N.Y., a corporation of New York Application April 25, 1958, Serial No. 731,036

9 Claims. (Cl. 219—81)

This invention relates to welding apparatus and more particularly to an apparatus for welding contact tapes together.

In manufacturing relay contacts, it is customary to form the contacts of a base metal having a precious metal contact surface welded thereto. By using a precious metal only to form the contact surface, a considerable reduction in cost is obtained. Since the contacts are only subject to arcing and corrosion at the contact surfaces, it is unnecessary to form the entire contacts of a more expensive precious metal when a conductive base metal will serve equally well.

Contacts of this type are generally formed by welding a thin precious metal tape to a larger base metal tape and then cutting the composite tape into lengths suitable for use as individual relay contacts. The optimum apparatus for effecting this welding operation would be one which utilized roller electrodes for both tapes so that no problems of sliding friction and the resultant wear would be encountered. The precious metal tape normally presents no problem since it is generally quite thin and flexible and may be bent about a very small roller electrode. In many cases, however, the cross-sectional configuration of the base metal tape is such that a roller electrode about which the base metal tape might be wound would be of a prohibitive size. In those cases where the base metal tape is relatively inflexible and of substantial size, electrodes must be provided which slidably engage this larger tape in order that the over-all size of the welding apparatus may be maintained within practical limits.

The use of electrodes which slidably contact one of the tapes to be welded presents new problems. Provision must be made to compensate for wear of the electrodes and for maintaining the electrodes in electrically conducting contact with the tape with a substantially uniform pressure while avoiding any displacement of the contacted tape relative to the other tape.

It is therefore a primary object of this invention to provide new and improved welding apparatus.

It is another object of this invention to provide an apparatus for welding an elongated flexible member to an elongated member which is substantially inflexible.

It is still another object of this invention to provide a welding apparatus which automatically compensates for wear of the sliding contact electrodes.

It is a further object of this invention to provide a welding apparatus in which the sliding contact electrodes are maintained in engagement with one of the articles being welded with substantially uniform pressure.

With these and other objects in view, the present invention contemplates a welding apparatus utilizing a roller type electrode for contacting a flexible tape and sliding type electrodes for contacting a substantially inflexible tape. The roller electrode is resiliently biased in a direction tending to maintain the tapes in welding contact and a pedestal having good wear resistance properties is provided for supporting the tapes in opposition to the force applied thereto by the resilient biasing of the roller electrode. The sliding contact electrodes are mounted on a floating carriage which is movable transversely of the line of travel of the tapes so that the carriage may be shifted as necessary to compensate for wear of the electrode. A pneumatic cylinder coupled with a source of regulated air pressure is provided for shifting the carriage if necessary in order to compensate for wear of the electrodes and also serves to maintain the electrode in electrically conducting contact with one of the tapes with substantially uniform pressure.

Other objects, advantages and novel features of the invention will become apparent upon consideration of the following detailed description taken in conjunction with the accompanying drawings, wherein:

Fig. 1 is a side elevation view in full section of an apparatus embodying the principal features of the invention; and Fig. 2 is a sectional view taken along the line 2—2 of Fig. 1.

Attention now is directed to the drawings wherein like numerals of reference designate like parts throughout the several views and wherein there is disclosed a welding apparatus having a base 10 to which is secured a tape supporting pedestal 11. A diamond 12 is secured within a recess formed in the top of the pedestal 11 and projects therebeyond. The base 10 and pedestal 11 are provided with a hollow passage 13 suitable for the circulation of a cooling fluid such as water. The passage 13 terminates in nozzles 14 which serve to direct the cooling fluid toward the weld zone. Additional nozzles or hoses can, of course, be utilized to obtain an increased cooling effect should this be found necessary or desirable.

A roller electrode 15 is rotatably mounted within the bifurcated extremity of an electrode support arm 16 by means of a pivot pin 17. The electrode 15 is provided with a peripheral groove 19 for a flexible precious metal tape 20. The arm 16 and hence the electrode 15 are resiliently urged in a direction indicated by the arrow in Fig. 1 to press the tape 20 against a base metal tape 21 and the tape 21 against the diamond 12. The resilient urging of the electrode 15 towards the pedestal 11 may be accomplished either by securing the arm 16 to the base 10 as a cantilever and utilizing the resiliency of the arm 16 or by pivotally mounting the arm 16 on the base 10 and interconnecting the base and support arm with a tension spring. In the embodiment shown in the drawings, the arm 16 is pivotally mounted on the base 10 by means of a pivot pin and support bracket (not shown). A tension spring 18 interconnecting the base 10 and arm 16 is provided for the purpose of urging the arm 16 in a counterclockwise direction as viewed in Fig. 1.

Guide quills 22 and 24 are provided for positioning the tape 21 in the plane of the pedestal 11 and the electrode 15. These quills are so designed that they permit a small degree of vertical movement of the tape 21 while substantially precluding lateral movement thereof. This permits the tape 21 to be firmly pressed in sliding contact with the diamond 12 while preventing lateral displacement of the tape 21 relative to the tape 20 which would cause the tape 20 to be welded in an off-center position.

A carriage 25 is provided to support a pair of sliding-contact, electrode members 26 and 27. The carriage 25 is slidably mounted for movement perpendicular to the path of travel of the tape 21 by means of projections 29 formed on the bottom thereof and slidable within grooves formed in sliding pads 30 which are secured to the base 10. The pads 30 may be formed of any suitable material, such as tungsten carbide, which has good wear resistance and a low coefficient of friction. A recess 31 is formed in the carriage 25 and completely surrounds the pedestal 11. The recess 31 is made sufficiently large so that the carriage 25 may be shifted laterally without contacting the pedestal 11.

The electrode member 27 is rigidly secured to one extremity of the carriage 25 by means of a screw 32 to insure good electrical contact therebetween. The other electrode member 26 is slidable along a top surface 34 of the carriage 25. A shoe 35 carried by a pivotally mounted arm 36 is firmly pressed against the top surface of the electrode member 26 due to the urging of a tension spring 37. This insures that the electrode member 26 will be held firmly against, and in good electrical contact with, the surface 34.

The electrode member 26 is secured to a piston rod 39 of a piston 40 which forms a part of an air cylinder 41. The air cylinder 41 is provided with a port 42 and a flexible hose 44 for connection with a regulated supply of air under constant pressure (not shown).

Operation

In order that a better understanding of the invention may be had, its mode of operation will now be described. The tape 21 is first fed through the guide quill 22 and the tape 20 is positioned in the groove 19 of the electrode 15 and bent around electrode 15, as shown in Fig. 1. The ends of the tapes 20 and 21 are then passed through the guide quill 24 and connected to any suitable means (not shown) for pulling the tapes through the apparatus. The pulling means is then started and an alternating potential is applied to the carriage 25 and to the electrode 15 through the arm 16 from a suitable source of supply, such as a transformer 45, the primary of which is connected to a suitable A.C. source. The power applied to the apparatus may also be D.C. power. In this case, the weld formed would be continuous whereas a succession of spaced individual welds results when A.C. power is used. The tape 20 is provided with a welding bead 46 for the purpose of effecting a concentration of current to insure good welds. The speed with which the tapes are pulled through the apparatus may be coordinated with the frequency of alternation of the generator 45 to achieve any desired spacing of the individual welds which result when the current peaks. The arm 16 and guide quills 22 and 24 are, of course, electrically insulated from the base 10, and hence the carriage 30, to preclude any shorting of the weld currents around the desired point of weld.

As the welding operation progresses, the weld currents are conducted to the base metal tape 21 through the electrode members 26 and 27. These members are both held in firm electrical contact with the tape 21 due to the air pressure within the cylinder 41. The air pressure inside the cylinder 41 will tend to cause the piston 40, and hence the electrode member 26, to move to the right, as viewed in Fig. 2, and thus will hold the member 26 against the left-hand side of the tape 21. At the same time, the air pressure acting against the left-hand end of the cylinder 41 will tend to cause the carriage 25 to move to the left. This movement of the carriage 25 will hold the electrode member 27 firmly against the right-hand side of the tape 21. As the welding operation progresses, the ends of the members 26 and 27, which are in contact with the tape 21, will begin to wear away. As this wear occurs, the piston 40 will move to the right and the carriage 25 will move to the left, under the influence of the regulated air pressure within the cylinder 41, to continue to hold the electrode members 26 and 27 in contact with the tape 21 with the desired pressure.

Thus, it can be seen that a welding apparatus has been provided in which compensation for wear of the sliding contact electrodes is automatically effected. Also, by providing the supporting pedestal, the pressure which is utilized to hold the sliding electrodes in contact with one of the tapes is independent of the pressure utilized to hold the individual tapes together in welding contact. Thus, a small pressure may be used to hold the sliding electrodes in electrical contact with one of the tapes while a greater force is applied to press the tapes together at the point of weld to insure the effecting of good welds.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A welding apparatus comprising a first electrode movable transversely with respect to the path of travel of a pair of work pieces to be welded, means resiliently urging said first electrode into contact with a first one of the work pieces, means for supporting the work pieces in opposition to the force applied thereto by said resilient means, a second electrode movable transversely with respect to a plane containing said first electrode, the work pieces and said supporting means, and means for maintaining said second electrode in contact with a second one of the work pieces with substantially uniform pressure.

2. A welding apparatus comprising a first electrode movable transversely with respect to the path of travel of a pair of work pieces to be welded, resilient means for urging said first electrode into contact with a first one of the work pieces, means for supporting a second one of said work pieces in opposition to the force applied to the work pieces by said resilient means, a second electrode movable transversely with respect to said first electrode, and means for holding said second electrode in contact with the second of said work pieces with substantially uniform pressure.

3. An apparatus for welding a pair of tapes comprising a roller electrode movable transversely with respect to the path of travel of the tapes, means resiliently urging said roller electrode into engagement with a first one of said tapes, means for supporting a second one of said tapes, said supporting means and said resilient means cooperating to maintain a portion of said tapes in welding contact, a second electrode adjacent said support and movable transversely with respect to said roller electrode, and means for maintaining said second electrode in electrically conducting contact with the second of said tapes with substantially uniform pressure.

4. An apparatus for welding a flexible tape to a relatively inflexible tape comprising means for supporting the inflexible tape, a roller electrode for supporting the flexible tape, said roller electrode being movable in the plane of said supporting means and transversely with respect to the line of travel of said inflexible tape, resilient means for urging said roller electrode toward said supporting means to maintain the tapes in welding contact, a second electrode movable transversely relative to the plane of said supporting means, and means for holding said second electrode in electrically conducting contact with the inflexible tape with substantially uniform pressure.

5. An apparatus for welding a flexible tape to a relatively inflexible tape comprising a base, means for supporting the inflexible tape secured to said base, a roller electrode for supporting the flexible tape pivotally mounted on said base, said roller electrode being movable in the plane of said supporting means and transversely with respect to the line of travel of said tapes, resilient means for urging said roller electrode toward said supporting means to press the tapes therebetween into welding contact, a carriage mounted on said base for movement transversely of the plane of said roller electrode and said supporting means, a second electrode mounted on said carriage and adapted to engage said inflexible tape, and means for moving said carriage to press said second electrode into electrically conducting contact with said inflexible tape with substantially uniform pressure.

6. In a welding apparatus for welding a first tape to a second tape, a support for the first tape, a carriage slidably mounted with respect to said support, a first electrode fixed to the carriage for engaging one edge of the first tape, a second electrode slidably mounted on the carriage for engaging the opposite edge of the first tape, a pressurized air cylinder mounted on said carriage, a piston operated by said air cylinder and connected to said second electrode for forcing said second electrode into engagement with the first tape, and means for pressing a second tape into engagement with the first tape on said support.

7. An apparatus for welding a flexible tape to a relatively inflexible tape comprising a base, means mounted on said base for supporting said inflexible tape, a roller electrode for supporting the flexible tape pivotally mounted on said base, said roller electrode being movable in the plane of said supporting means and transversely with respect to the path of travel of said tapes, resilient means for urging said roller electrode toward said supporting means to maintain the tapes therebetween in welding contact, a carriage slidable on said base for movement transversely of the plane of said roller electrode and said supporting means, a second electrode mounted on said carriage and adapted to engage said inflexible tape, said second electrode comprising first and second members disposed on opposite sides of the path of travel of said tapes, said first member being fixed to said carriage and said second member being movable on said carriage toward and away from said first member, and means for moving said carriage relative to said base and said second member relative to said carriage for holding said second electrode members in electrically conducting contact with said inflexible tape with substantially uniform pressure.

8. An apparatus for welding a flexible tape to a relatively inflexible tape comprising a base, means secured to said base for slidably supporting said inflexible tape and adjacent the line of travel thereof, guide means for aligning the inflexible tape with said supporting means, a roller electrode pivotally mounted on said base for supporting and guiding the flexible tape, said roller electrode being provided with a peripheral groove for receiving the flexible tape, said roller electrode pivoting in the plane of said supporting means and transversely with respect to the path of travel of said inflexible tape, resilient means for urging said roller electrode toward said supporting means to press the tapes therebetween into welding contact, a carriage slidable on said base for movement transversely of the plane of said supporting means and said roller electrode, a second electrode mounted on said carriage and adapted to engage opposite sides of said inflexible tape, said second electrode comprising first and second members disposed on opposite sides of the path of travel of said tapes, said first member being rigidly secured to said carriage and said second member being movable thereon toward and away from said first member, and pneumatic means for moving said carriage relative to said base and said second member relative to said carriage to maintain said second electrode members in electrically conducting contact with the inflexible tape with substantially uniform pressure.

9. A welding apparatus comprising a first electrode movable substantially transversely with respect to the path of travel of a pair of work pieces to be welded, means resiliently urging said first electrode into contact with a first one of said work pieces, means fixed relative to said first electrode for slidably supporting a second one of said work pieces and opposing the force applied by said resilient means to maintain the work pieces in welding contact, a second electrode positioned adjacent said supporting means and movable in a plane substantially perpendicular to the plane of movement of said first electrode, and fluid actuated means for maintaining said second electrode in contact with the second one of the work pieces with substantially uniform pressure.

References Cited in the file of this patent
UNITED STATES PATENTS 1,898,923  Whitworth _____ Feb. 21, 1933